(12) United States Patent
Katayama et al.

(10) Patent No.: US 9,794,877 B2
(45) Date of Patent: Oct. 17, 2017

(54) TRANSMITTING DEVICE, RECEIVING DEVICE, COMMUNICATION DEVICE, PROGRAMS, TRANSMISSION METHOD, AND RECEIVING METHOD FOR WIRELESS COMMUNICATION OF CONTINUOUS DATA IN THE FORM OF PACKETS

(71) Applicant: International Business Machines Corporation, Armonk, NY (US)

(72) Inventors: Yasunao Katayama, Tokyo (JP); Yasuteru Kohda, Kanagawa-ken (JP); Kohji Takano, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 14/785,658

(22) PCT Filed: Apr. 11, 2014

(86) PCT No.: PCT/JP2014/060524
§ 371 (c)(1),
(2) Date: Feb. 4, 2016

(87) PCT Pub. No.: WO2014/178275
PCT Pub. Date: Nov. 6, 2014

(65) Prior Publication Data
US 2016/0150473 A1 May 26, 2016

(30) Foreign Application Priority Data

Apr. 30, 2013 (JP) ................. 2013-094907

(51) Int. Cl.
*H04W 52/02* (2009.01)

(52) U.S. Cl.
CPC ... *H04W 52/0216* (2013.01); *H04W 52/0248* (2013.01); *Y02B 60/50* (2013.01)

(58) Field of Classification Search
None
See application file for complete search history.

(56) References Cited

U.S. PATENT DOCUMENTS 7,779,337 B2 8/2010 Song et al.
2008/0320528 A1\* 12/2008 Kim ................. H03M 13/2915
725/62

(Continued)

FOREIGN PATENT DOCUMENTS

| JP | 1056468 A | 2/1998 |
| JP | 2001230678 A | 8/2001 |

(Continued)

OTHER PUBLICATIONS

Katayama et al., "MIMO Link Design Strategy for Wireless Data Center Applications," IEEE Wireless Communications and Networking Conference (WCNC), 2012, pp. 3302-3306, IEEE. DOI: 10.1109/WCNC.2012.6214378.

(Continued)

*Primary Examiner* — Eunsook Choi
(74) *Attorney, Agent, or Firm* — Nathan M. Rau

(57) ABSTRACT

Transmitting device, receiving device, communication device, programs, transmission method, and receiving method for wireless communication of continuous data in the form of packets. A transmitting device includes a data receiving unit that receives continuous data from a network, the continuous data including actual data and null data; a packetizing unit that deletes at least a part of the null data from the continuous data to generate a packet for wireless communication; a transmitting unit that modulates the packet into a radio carrier wave and wirelessly transmits the resulting packet; and a control unit that causes the transmitting unit to stop transmission of the radio carrier wave (Continued)

during at least a part of a time period in which no such packet is transmitted wirelessly.

4 Claims, 12 Drawing Sheets

(56) References Cited

U.S. PATENT DOCUMENTS

| | | | |
|---|---|---|---|
| 2009/0094274 A1 | 4/2009 | Gorelik et al. | |
| 2009/0106622 A1* | 4/2009 | Yokokawa | H03M 13/11 |
| | | | 714/752 |
| 2011/0081872 A1 | 4/2011 | Bar-Sade et al. | |
| 2011/0128961 A1* | 6/2011 | Brooks | H04L 12/2801 |
| | | | 370/392 |
| 2012/0011420 A1* | 1/2012 | Kim | H04H 20/57 |
| | | | 714/784 |
| 2013/0138918 A1* | 5/2013 | Muff | G06F 15/7832 |
| | | | 712/24 |
| 2013/0305113 A1* | 11/2013 | Shinohara | H04L 1/0058 |
| | | | 714/752 |
| 2014/0189471 A1* | 7/2014 | Lee | H04N 21/23614 |
| | | | 714/776 |
| 2015/0078473 A1 | 3/2015 | Ko et al. | |

FOREIGN PATENT DOCUMENTS

| | | |
|---|---|---|
| JP | 2003224611 A | 8/2003 |
| JP | 2004215138 A | 7/2004 |
| JP | 2006080715 A | 3/2006 |
| JP | 2006108966 A | 4/2006 |
| JP | 2006352530 A | 12/2006 |
| JP | 2007104552 A | 4/2007 |
| JP | 2007318791 A | 12/2007 |
| JP | 2009141841 A | 6/2009 |
| JP | 6021132 B2 | 11/2016 |

OTHER PUBLICATIONS

Ohata et al., "1.25 Gbps Wireless Gigabit Ethernet Link at 60 GHz-Band," IEEE Radio Frequency Integrated Circuits (RFIC) Symposium, 2003, pp. 509-512, IEEE. DOI: 10.1109/RFIC.2003.1213996.

Rakotondrainibe et al., "A low Complexity Wireless Gigabit Ethernet IfoF 60 GHz H/W Platform and Issues," Wireless World Research Forum Meeting 22 (WWRF), 2009, pp. 1-6.

International Search Report and Written Opinion (PCT), International Application No. PCT/JP2014/060524, Dated Jul. 15, 2014.

Decision to Grant a Patent, JP Patent Application No. 2015-514799, Mailed Sep. 6, 2016.

Katayama et al., "Transmitting Device, Receiving Device, Communication Device, Programs, Transmission Method, and Receiving Method for Wireless Communication of Continuous Data in the Form of Packets," U.S. Appl. No. 15/424,589, filed Feb. 3, 2017.

Notification of Reasons for Refusal, JP Patent Application No. 2015-514799, mailed Aug. 2, 2016, 4 pages.

Notification of Reasons for Refusal, JP Patent Application No. 2015-514799, mailed Apr. 12, 2016, 8 pages.

* cited by examiner

TRANSMITTING DEVICE, RECEIVING DEVICE, COMMUNICATION DEVICE, PROGRAMS, TRANSMISSION METHOD, AND RECEIVING METHOD FOR WIRELESS COMMUNICATION OF CONTINUOUS DATA IN THE FORM OF PACKETS

CROSS-REFERENCE TO RELATED APPLICATION

This application claims priority under 35 U.S.C. §371 from PCT Application PCT/JP2014/060524, filed on Apr. 11, 2014, which claims priority from Japanese Patent Application No. 2013-094907, filed Apr. 30, 2013. The entire contents of both applications are incorporated herein by reference.

FIELD OF THE INVENTION

The present invention relates to a transmitting device, a receiving device, a communication device, programs, a transmission method, and a receiving method for wireless communication of continuous data in the form of packets.

BACKGROUND

There is known a transmitting device which deletes a part of null data from continuous data on a network such as the Ethernet (registered trademark) and transmits the continuous data including actual data (see, for example, Japanese Patent Application Publication No. 2009-141841).

SUMMARY OF THE INVENTION

With the above-described technique, however, a large amount of power would be consumed by a radio carrier wave.

A first aspect of the present invention provides a transmitting device which includes: a data receiving unit that receives continuous data from a network, the continuous data including actual data and null data; a packetizing unit that deletes at least a part of the null data from the continuous data to generate a packet for wireless communication; a transmitting unit that modulates the packet into a radio carrier wave and wirelessly transmits the resulting packet; and a control unit that causes the transmitting unit to stop transmission of the radio carrier wave during at least a part of a time period in which no such packet is transmitted wirelessly.

A second aspect of the present invention provides a receiving device which includes: a receiving unit that demodulates a radio carrier wave transmitted wirelessly from a transmitting side into a packet and receives the resulting packet, the radio carrier wave being transmitted in the state where at least a part of null data has been deleted on the transmitting side from continuous data received from a first network, the continuous data including actual data and the null data; a data generating unit that adds the null data to, or deletes the null data from, the packet to generate continuous data; and a data transmitting unit that transmits the continuous data including the actual data and the null data to a second network.

A third aspect of the present invention provides a communication device which includes the transmitting device and the receiving device described above.

A fourth aspect of the present invention provides a program for transmission for causing a computer to function as: a data receiving unit that receives continuous data from a network, the continuous data including actual data and null data; a packetizing unit that deletes at least a part of the null data from the continuous data to generate a packet for wireless communication; a transmitting unit that modulates the packet into a radio carrier wave and wirelessly transmits the resulting packet; and a control unit that causes the transmitting unit to stop transmission of the radio carrier wave during at least a part of a time period in which no such packet is transmitted wirelessly.

A fifth aspect of the present invention provides a program for reception for causing a computer to function as: a receiving unit that demodulates a radio carrier wave transmitted wirelessly from a transmitting side into a packet and receives the resulting packet, the radio carrier wave being transmitted in the state where at least a part of null data has been deleted on the transmitting side from continuous data received from a first network, the continuous data including actual data and the null data; a data generating unit that adds the null data to, or deletes the null data from, the packet to generate continuous data; and a data transmitting unit that transmits the continuous data including the actual data and the null data to a second network.

A sixth aspect of the present invention provides a transmission method which includes: a data receiving step of receiving continuous data from a network, the continuous data including actual data and null data; a packetizing step of deleting at least a part of the null data from the continuous data to generate a packet for wireless communication; a transmitting step of modulating the packet into a radio carrier wave and wirelessly transmitting the resulting packet; and a control step of causing transmission of the radio carrier wave in the transmitting step to be stopped during at least a part of a time period in which no such packet is transmitted wirelessly.

A seventh aspect of the present invention provides a receiving method which includes: a receiving step of demodulating a radio carrier wave transmitted wirelessly from a transmitting side into a packet and receiving the resulting packet, the radio carrier wave being transmitted in the state where at least a part of null data has been deleted on the transmitting side from continuous data received from a first network, the continuous data including actual data and the null data; a data generating step of adding the null data to, or deleting the null data from, the packet to generate continuous data; and a data transmitting step of transmitting the continuous data including the actual data and the null data to a second network.

The summary of the invention described above does not list all the features indispensable to the present invention; any sub-combination of these features can also embody the invention.

DETAILED DESCRIPTION OF THE PREFERRED EMBODIMENTS

While the present invention will be described below with reference to an embodiment, the following embodiment is not to restrict the invention recited in the claims for patent. Further, all the combinations of the features discussed in the embodiment are not necessarily indispensable for the solving means of the invention.

Figure 1:
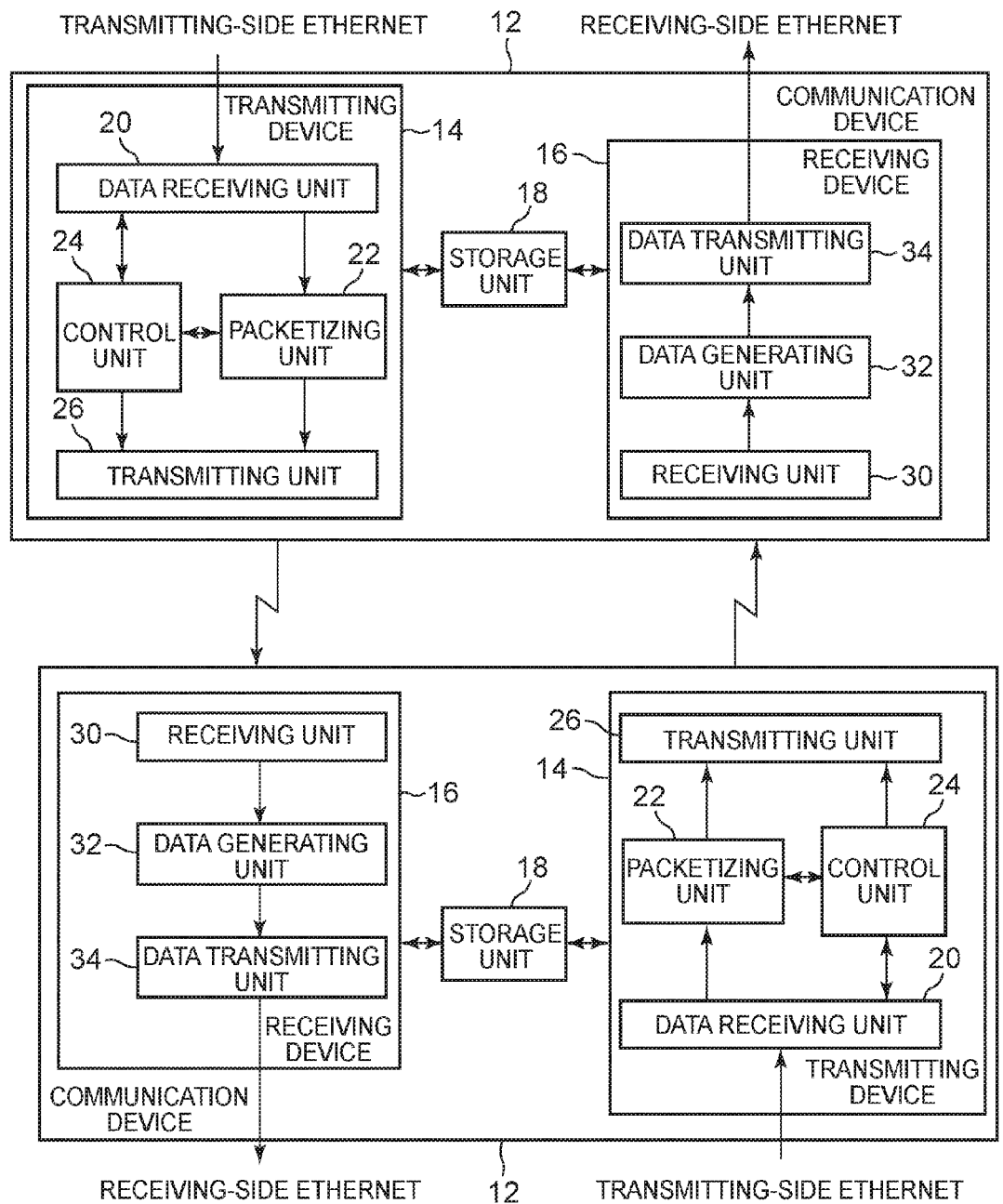
FIG. 1 shows the overall configuration of a communication system 10.

FIG. 1 shows the overall configuration of a communication system 10. The communication system 10 includes a plurality of communication devices 12. In the example shown in FIG. 1, the communication system 10 includes two communication devices 12. Each communication device 12 has a transmitting device 14, a receiving device 16, and a storage unit 18. In a communication device 12, the transmitting device 14 modulates a packet WP, having at least a part of null data IFS deleted from continuous data SD input from a wired transmitting-side Ethernet, into a radio carrier wave and transmits the resulting packet. Here, the transmitting device 14 makes the amplitude of the radio carrier wave zero during at least a part of the time period in which no packet WP is wirelessly transmitted, so as to stop the transmission of the radio carrier wave. This can reduce the power consumed in the communication device 12. The receiving device 16 generates continuous data from a received packet WP, and adds null data to, or deletes null data from, the continuous data before transmitting it to a wired receiving-side Ethernet. The Ethernet is an example of a network. The Ethernet has a communication speed of, for example, 10 Mbps, 100 Mbps, 1 Gbps, or 10 Gbps. The Ethernet offers, for example, a full-duplex communication system, although it can offer another communication system. Further, the Ethernet can conform to future standards.

The transmitting device 14 has a data receiving unit 20, a packetizing unit 22, a control unit 24, and a transmitting unit 26. The data receiving unit 20 is connected to the wired transmitting-side Ethernet. The data receiving unit 20 receives continuous data SD from another apparatus on the transmitting-side Ethernet. The continuous data SD includes actual data PC, including images, characters, and other information, and also includes null data IFS. The data receiving unit 20 is, for example, a circuit in conformity to the media independent interface (MII) standard defined in the Ethernet. It is noted that MII includes GMII, XMII, and RGMII.

The packetizing unit 22 is connected to the data receiving unit 20. The packetizing unit 22 acquires the continuous data SD, including actual data PC and null data IFS, from the data receiving unit 20. The packetizing unit 22 deletes at least a part of the null data IFS. For example, when there is continuous null data IFS of a predetermined length or longer, the packetizing unit 22 deletes the null data IFS of the predetermined length or longer. The predetermined length here is 96 bits, which is the minimum length of null data IFS between the pieces of actual data PC, defined in the Ethernet. The packetizing unit 22 generates a packet WP to be transmitted by a radio carrier wave, and outputs the packet to the transmitting unit 26. For example, the packetizing unit 22 generates a fixed-length packet WP whose data amount is predetermined, by deleting the null data IFS. Alternatively, the packetizing unit 22 can generate a variable-length packet WP whose data amount can vary, by deleting the null data IFS.

The transmitting unit 26 is connected to the packetizing unit 22. The transmitting unit 26 acquires the packet WP from the packetizing unit 22. The transmitting unit 26 modulates the packet WP, with at least a part of null data IFS deleted from the continuous data SD, into a radio carrier wave and transmits the resulting packet wirelessly.

The control unit 24 is connected to the data receiving unit 20, the packetizing unit 22, and the transmitting unit 26, and controls the data receiving unit 20 and the transmitting unit 26. For example, the control unit 24 acquires, from the packetizing unit 22, information about the existence of a packet WP to be transmitted, and stops the transmission of the radio carrier wave by the transmitting unit 26 during at least a part of the time period in which no packet WP is transmitted wirelessly. It is noted that the control unit 24 can cause the transmitting unit 26 to stop the transmission of the radio carrier wave, independently of the packetizing unit 22. For example, the control unit 24 can cause the transmitting unit 26 to stop the transmission of the radio carrier wave when the control unit 24 acquires information to the effect that there is no actual data PC received from the data receiving unit 20. The control unit 24 also stops the transmission of the radio carrier wave when the time period in which null data IFS is transmitted wirelessly has continued for a predetermined length or longer.

The receiving device 16 has a receiving unit 30, a data generating unit 32, and a data transmitting unit 34. The receiving unit 30 demodulates the radio carrier wave that the transmitting side has wirelessly transmitted, with at least a part of null data IFS deleted from the continuous data SD including actual data PC and null data IFS that was received from the transmitting-side Ethernet, and receives the packet WP. The receiving unit 30 outputs the packet WP to the data generating unit 32.

The data generating unit 32 is connected to the receiving unit 30. The data generating unit 32 acquires the packet WP from the receiving unit 30. The data generating unit 32 adds null data IFS to, or deletes null data IFS from, the packet WP to generate continuous data SD. For example, in the case where the transmitting side has deleted null data IFS and, thus, the spacing between the pieces of actual data PC is less than a predetermined length, the data generating unit 32 adds null data IFS so as to make the spacing between the pieces of actual data PC not less than the predetermined length. The predetermined length of spacing here is, by way of example, 96 bits, which is defined in the Ethernet. Further, the data generating unit 32 adds null data IFS to the continuous data SD during the time period in which no radio carrier wave is received. Here, it is preferable that the data generating unit 32 adds or deletes null data IFS in accordance with the amount of unprocessed data in the packet WP transmitted from the transmitting side. This enables the receiving device 16 on the receiving side to work with no problems even if the receiving device 16 on the receiving side has lower processing capacity than the transmitting device 14 on the transmitting side.

The data transmitting unit 34 is connected to the data generating unit 32. The data transmitting unit 34 acquires the continuous data SD from the data generating unit 32. The data transmitting unit 34 is connected to a wired receiving-side Ethernet. The data transmitting unit 34 transmits the continuous data SD, including actual data PC and null data IFS, to another apparatus on the receiving-side Ethernet. The data transmitting unit 34 is, for example, a circuit in conformity to MII defined in the Ethernet.

The storage unit 18 is connected to the transmitting device 14 and the receiving device 16. The storage unit 18 temporarily buffers a packet WP before transmission in the transmitting device 14 and a packet WP received in the receiving device 16. Specifically, the storage unit 18 stores the packet WP to be transmitted, which is input from the packetizing unit 22. The storage unit 18 outputs the packet WP to be transmitted, stored therein, to the packetizing unit 22. The storage unit 18 stores the packet WP received, which is input from the data generating unit 32. The storage unit 18 outputs the packet WP received and stored, to the data generating unit 32. The storage unit 18 is, for example, a first-in/first-out (FIFO) memory.

Figure 2:
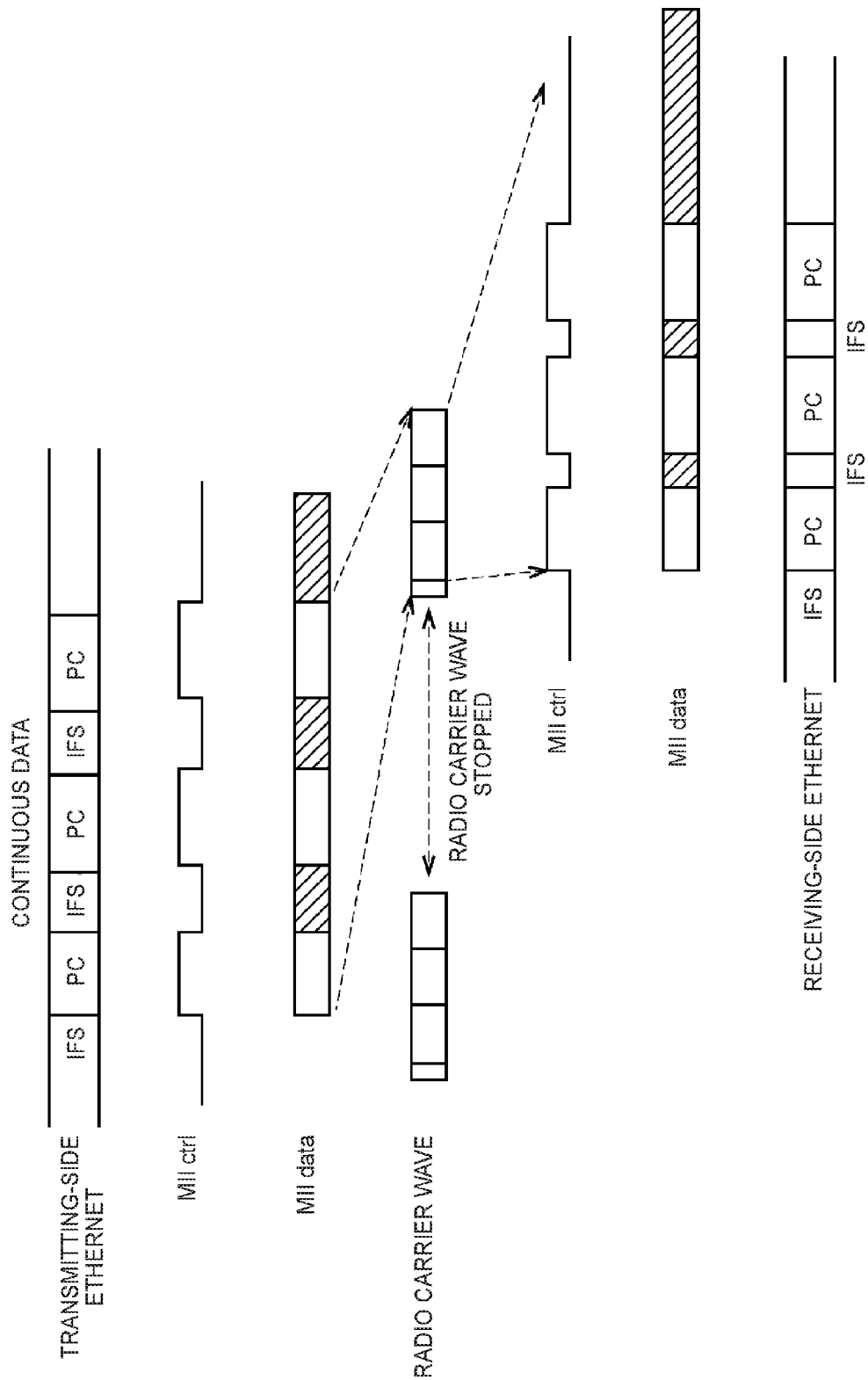
FIG. 2 illustrates changes of data as it is transmitted from a transmitting-side Ethernet to a receiving-side Ethernet.

FIG. 2 illustrates changes of data as it is transmitted from a transmitting-side Ethernet to a receiving-side Ethernet. FIG. 2 shows the case of transmitting/receiving a packet WP with all null data IFS deleted. In FIG. 2, the horizontal axis represents time.

On the transmitting device 14 side, firstly, the transmitting-side Ethernet inputs continuous data SD, shown at the top in FIG. 2, to the data receiving unit 20. The continuous data SD includes actual data PC and null data IFS that fills between the pieces of actual data PC.

As shown in the second and third rows from the top in FIG. 2, the data receiving unit 20 outputs the Ethernet actual data PC, included in the continuous data SD transferred in the form of 10-bit MII code, to the packetizing unit 22.

The packetizing unit 22 extracts the actual data PC from the continuous data SD input from the data receiving unit 20, by using a two-bit control signal included in the 10-bit MII code, without decoding the MII data signal. The packetizing unit 22 causes the storage unit 18 to temporarily store the data from which all null data IFS that does not have to be transferred has been deleted, as a packet WP. Here, it is preferable that the packetizing unit 22 causes the transmitting unit 26 to transmit the packet WP only after the continuous data SD transmitted from the transmitting-side Ethernet via the data receiving unit 20 has been processed by a predetermined minimum data amount ML or more and the processed data has been stored into the storage unit 18. This allows the transmitting unit 26 to start transmission after the predetermined minimum data amount ML or more of the continuous data SD has been processed and stored into the storage unit 18. Preferably, the minimum data amount ML is determined to satisfy the following expression, in consideration of the time during which transmission of the radio carrier wave is stopped. As the minimum data amount ML increases, the output time of the radio carrier wave decreases, and the latency increases. It is still more preferable that the packetizing unit 22 causes the transmitting unit 26 to transmit the packet WP after the minimum data amount ML of the MII codes has been processed and when the currently processed piece of Ethernet actual data PC has been processed to its tail end.

$$ML*T_{Ethernet\ clock} > (ML+WO)*T_{wireless\ clock}$$

$T_{Ethernet\ clock} > T_{wireless\ clock}$

ML: minimum data processing amount $T_{Ethernet\ clock}$: Ethernet clock cycle $T_{wireless\ clock}$: Wireless clock cycle WO: Wireless overhead As shown in the fourth row from the top in FIG. 2, the packetizing unit 22 causes the transmitting unit 26 to modulate the packet WP, which has been obtained by deleting the null data IFS and stored in the storage unit 18, into a radio carrier wave and transmit the resulting packet. Here, the control unit 24 stops the radio carrier wave during the time between one packet WP and another packet WP, which is created as the null data IFS is deleted. That is, the control unit 24 stops the transmission of the radio carrier wave during the time period in which no Ethernet actual data PC is transmitted.

On the receiving side, the receiving unit 30 receives the radio carrier wave shown in the fourth row from the top in FIG. 2. The receiving unit 30 outputs the received packet WP to the data generating unit 32. As shown in the fifth and sixth rows from the top in FIG. 2, the data generating unit 32 adds null data IFS to reconstruct the continuous data SD in the MII codes from the received packet WP. For example, the data generating unit 32 adds null data IFS such that the spacing between the pieces of Ethernet actual data PC becomes 96 bits, which is the Ethernet standard. Further, the data generating unit 32 can add or delete null data IFS so as to resolve the asynchronism which is attributable to the difference in standards (for example, TX and RX) and to the error between the self clock and the clock of the transmitting device 14 that has transmitted the radio carrier wave. It is noted that the data generating unit 32 can perform flow control, insertion of "Carrier extend", or other operations, as necessary, in accordance with the Ethernet standards such as carrier sense multiple access/collision detection (CSMA/CD). The data generating unit 32 reconstructs the continuous data SD including actual data PC and null data IFS, shown in the seventh row from the top in FIG. 2, and temporarily stores the data into the storage unit 18. The data transmitting unit 34 reads the continuous data SD from the storage unit 18, and outputs the read data to the receiving-side Ethernet.

Figure 3:
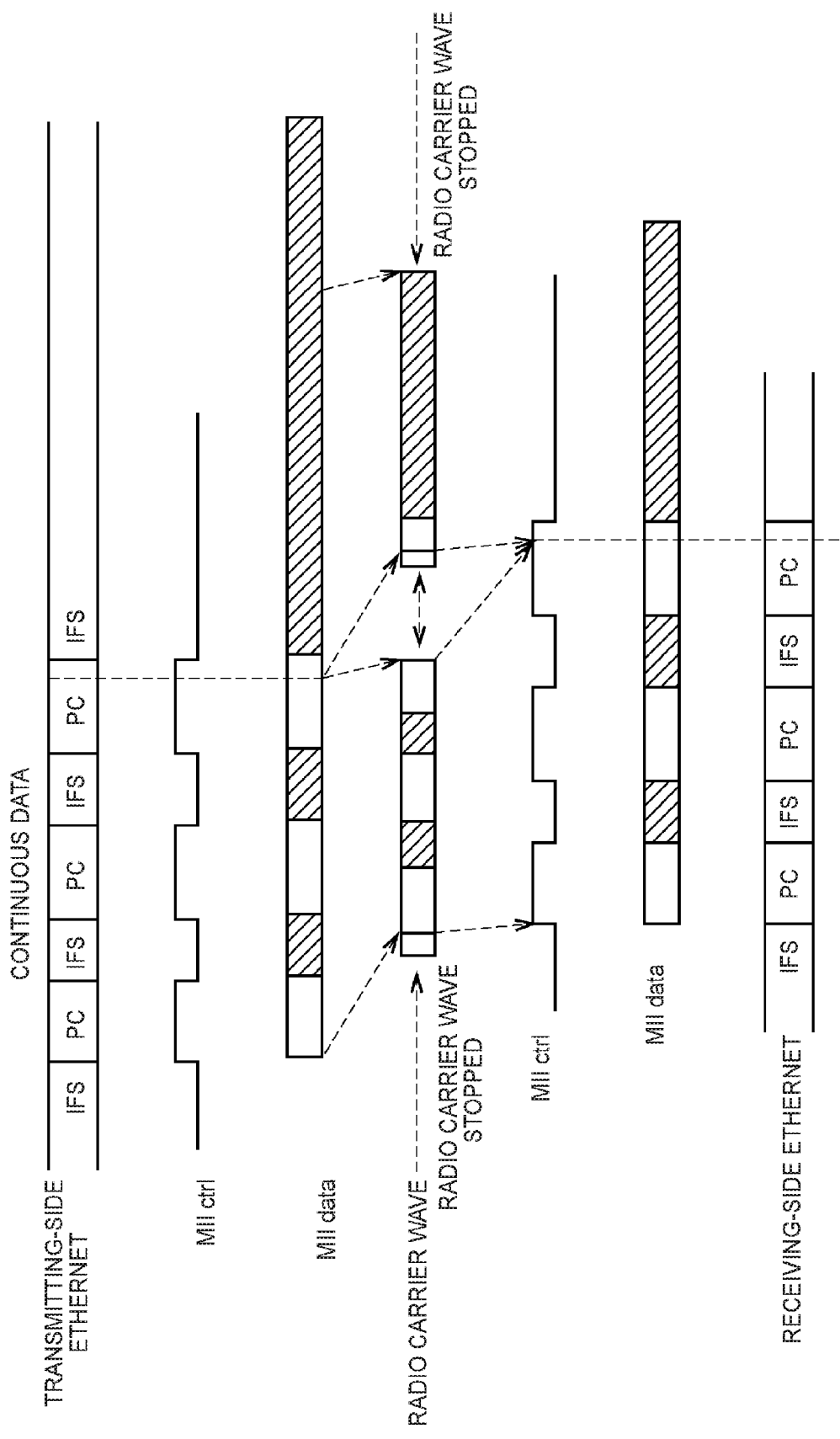
FIG. 3 illustrates changes of data as it is transmitted from a transmitting-side Ethernet to a receiving-side Ethernet.

FIG. 3 illustrates changes of data as it is transmitted from a transmitting-side Ethernet to a receiving-side Ethernet. FIG. 3 shows the case of transmitting/receiving a fixed-length packet WP with at least a part of null data IFS deleted. In FIG. 3, the horizontal axis represents time. On the transmitting side, the transmitting-side Ethernet inputs continuous data SD, shown at the top in FIG. 3, to the data receiving unit 20. The data receiving unit 20 outputs the continuous data SD to the packetizing unit 22.

As shown in the fourth row from the top in FIG. 3, the packetizing unit 22 extracts actual data PC from the continuous data SD input from the data receiving unit 20, and generates data with at least a part of null data IFS deleted, as a packet WP. The packetizing unit 22 stores the generated packet into the storage unit 18. Here, it is preferable for the packetizing unit 22 to delete the null data IFS such that the null data IFS will not be at the top of the packet WP. This can lengthen the time during which the transmitting unit 26 can stop the radio carrier wave, so that the power consumption can further be reduced.

The packetizing unit 22 deletes a part of the null data IFS so as to make the packet WP have a predetermined fixed length. In the case of generating a fixed-length packet WP, it is further preferable for the packetizing unit 22 to generate a packet WP that maintains the temporal relationship between the pieces of Ethernet actual data PC, without deleting the null data IFS present between the pieces of Ethernet actual data PC included in one packet WP.

The packetizing unit 22 reads the packet WP stored in the storage unit 18, and causes the transmitting unit 26 to transmit the packet in the state where it is modulated into a radio carrier wave. Here, the transmitting unit 26 transmits the fixed-length packet WP while maintaining the Ethernet timing, i.e. the MII code timing. It is noted that, on the transmitting side, the latency from when the data receiving unit 20 starts receiving actual data PC in continuous data SD until when the transmitting unit 26 starts transmitting the data at the head of a packet WP is substantially the same for all packets WP. Here, wireless data transfer is faster than wired data transfer. The control unit 24 can therefore cause the transmitting unit 26 to stop transmission of the radio carrier wave during the time between a preceding packet WP and a succeeding packet WP which is created due to the above-described difference in frequency between wireless clock and wired clock and due to the deletion of null data IFS. Further, when the null data IFS continuing for a predetermined time or longer causes a packet WP to attain a fixed length or longer, the control unit 24 causes the transmitting unit 26 to stop the transmission of the radio carrier wave by refraining from transmitting the null data IFS. Here, in the case of a packet WP that maintains the temporal relationship between the pieces of Ethernet actual data PC, the transmitting unit 26 can wirelessly transmit the packet while maintaining the MII data timing of the continuous data SD. This allows the data generating unit 32 in the receiving device 16 to reconstruct the continuous data SD at the timing substantially the same as that on the transmitting side. It is thus possible to decrease the uncertainty in the receiving time of the packet WP, thereby enabling transmission with reduced latency. Accordingly, it is possible to secure a proper order between the time when the last piece of data in a preceding packet WP is transmitted to the wired Ethernet on the data transmitting unit 34 and the time when a next packet WP is received on the receiving unit 30. This ensures that, on the receiving side, the data transmitting unit 34 transmits the last piece of data in a preceding packet WP to the wired Ethernet after the receiving unit 30 has received a succeeding packet WP, thereby eliminating data shortage.

On the receiving device 16 side, the receiving unit 30 receives the radio carrier wave shown in the fourth row from the top in FIG. 3. On the receiving side, once the first part of each packet WP is received, the receiving unit 30 transmits the data immediately to a wired Ethernet, without storing the data. On the receiving side, the latency from when the first part of data in a packet WP is received until when it is transferred to the wired Ethernet is substantially the same for all packets WP. That is, on the receiving side, a packet WP is transmitted to the wired Ethernet immediately upon arrival of the payload of the packet WP. The receiving unit 30 outputs the packet WP, demodulated from the received radio carrier wave, to the data generating unit 32. As shown in the fifth and sixth rows from the top in FIG. 3, the data generating unit 32 adds null data IFS on the basis of the Ethernet clock on the receiving side, which is different from that on the transmitting side, to thereby reconstruct the continuous data SD including Ethernet actual data PC from the received packet WP. The data generating unit 32 temporarily stores the resulting data into the storage unit 18. In this manner, the data generating unit 32 causes the data between the pieces of Ethernet actual data PC reconstructed, to comply with the Ethernet standard. Here, in the case where the Ethernet actual data PC continues for a long time and null data IFS cannot be deleted in the transmitting device 14, it is preferable for the data generating unit 32 to delete a part of the null data IFS in the reconstructed continuous data SD, or add null data IFS to the continuous data SD, for clock timing adjustment, so as to resolve the asynchronism between the Ethernet clocks on the transmitting side and the receiving side. Further, the data generating unit 32 adds null data IFS during the time period in which no radio carrier wave is received. The data generating unit 32 reads the reconstructed continuous data SD from the storage unit 18 and outputs the read data to the data transmitting unit 34. The data transmitting unit 34 outputs the continuous data SD including the actual data PC and the null data IFS, shown in the seventh row from the top in FIG. 3, to the receiving-side Ethernet. Here, in the case where the actual data PC in the continuous data SD has been divided into two packets WP on the transmitting side, the receiving unit 30 receives the first part of the payload of a second packet WP at the time when the data transmitting unit 34 transmits the last part of the firstly received packet WP to the wired Ethernet. Accordingly, on the receiving side, the data generating unit 32 can readily reconstruct the actual data PC of the continuous data SD that was divided into the first packet WP and the second packet WP.

Figure 4:
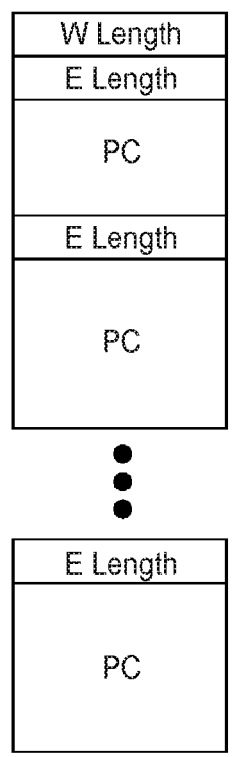
FIG. 4 illustrates a data structure of a packet WP.

FIG. 4 illustrates a data structure of a packet WP. As an example, the packet WP shown in FIG. 4 is a variable-length packet with all null data IFS deleted. The packet WP shown in FIG. 4 includes a packet length W_Length, a packet length E_Length, and Ethernet actual data PC. The packet length W_Length is information indicating the entire length of the packet WP. The packet length E_Length is information indicating the length of the actual data PC in the Ethernet continuous data SD included in the packet WP. The packet length is calculated by counting the MII codes. As such, even in the case where the packetizing unit 22 in the transmitting device 14 on the transmitting side has deleted all null data IFS in the continuous data SD, the packet length E_Length is included in the packet WP. This enables the receiving device 16 on the receiving side to divide a plurality of pieces of Ethernet actual data PC included in the received packet(s) WP, in accordance with the packet length E_Length, to thereby reconstruct the actual data PC in the original state. In the example shown in FIG. 4, the Ethernet actual data PC is included in a single packet WP, without being divided into pieces. It is noted that a packet WP can include "Padding Length" which indicates the length of null data IFS added for the purpose of adjusting the length of the packet WP.

Figure 5:
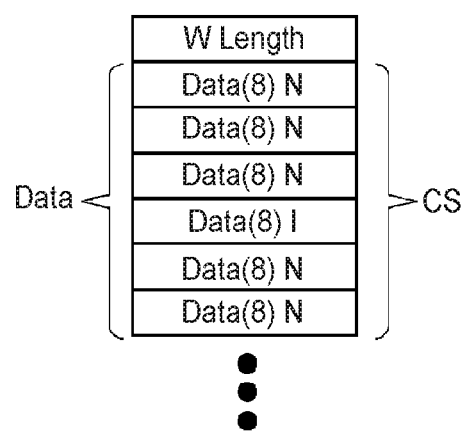
FIG. 5 illustrates another data structure of a packet WP.

FIG. 5 illustrates another data structure of a packet WP. As an example, the packet WP shown in FIG. 5 is a variable-length packet with a part of null data IFS deleted. The packet WP shown in FIG. 5 includes a packet length W_Length of the packet WP, and a plurality of pieces of normal data. The normal data includes, for example, 8-bit data "Data" and a 1-bit or 2-bit control signal CS. For example, when the control signal CS is "N", it means that the 8-bit data "Data" is actual data PC included in the continuous data SD. When the control signal CS is "I", it means that the 8-bit data "Data" is null data IFS included in the continuous data SD. As such, the packetizing unit 22 in the transmitting device 14 on the transmitting side has left a part of null data IFS in the continuous data SD. This enables the receiving device 16 on the receiving side to detect the null data IFS included in the received packet WP as a boundary between the pieces of actual data PC in the continuous data SD, and divide and reconstruct the pieces of Ethernet actual data PC to the original state. In the example shown in FIG. 5, the Ethernet actual data PC can be divided to belong to two packets WP.

Figure 6:
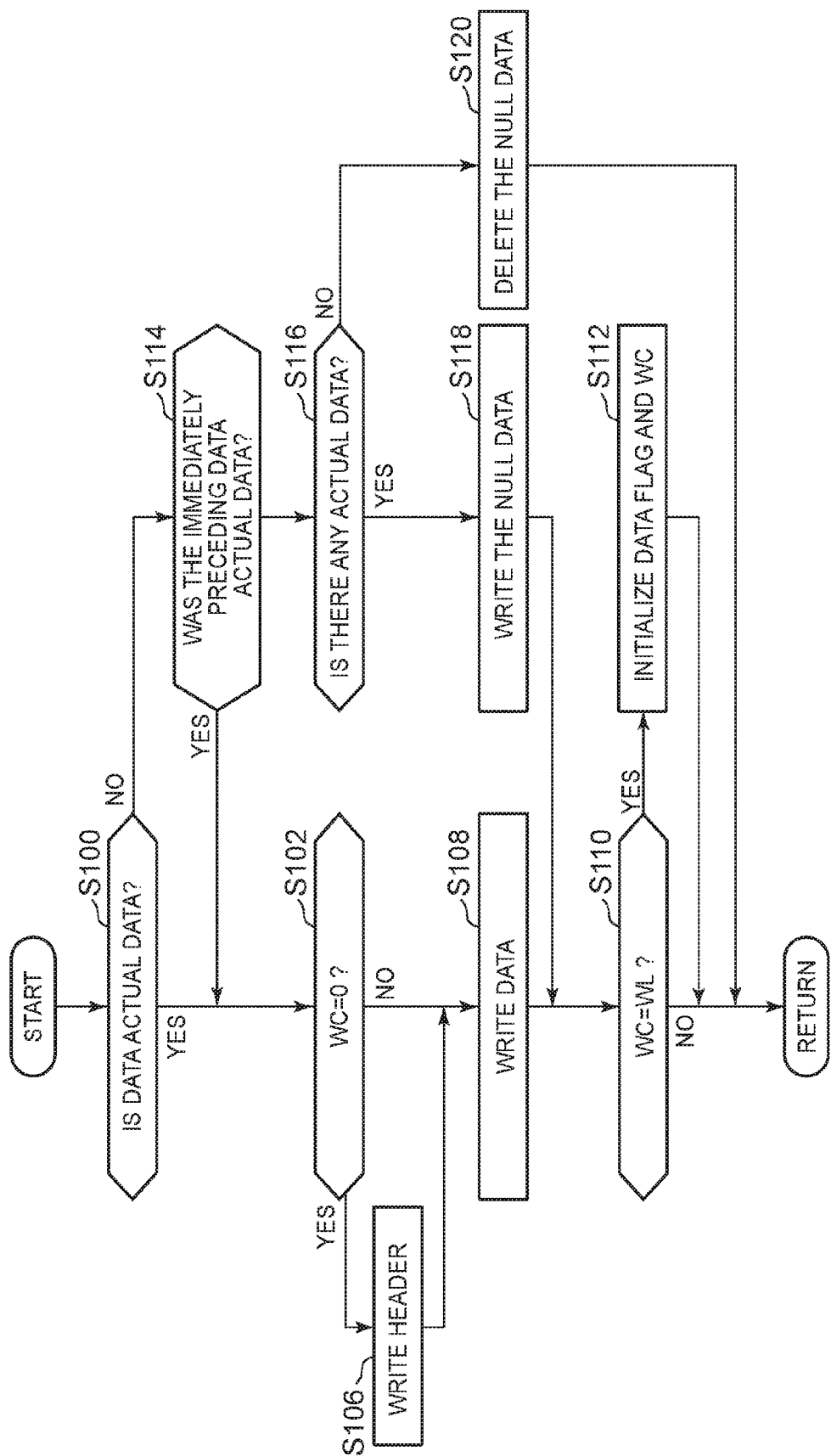
FIG. 6 is a flowchart illustrating a process of writing a fixed-length packet WP to a storage unit 18, performed by a packetizing unit 22 in a transmitting device 14.

FIG. 6 is a flowchart illustrating a process of writing a fixed-length packet WP to the storage unit 18, performed by the packetizing unit 22 in the transmitting device 14. As shown in FIG. 6, in the writing process in the transmitting device 14, when continuous data SD is input from the transmitting-side Ethernet, the packetizing unit 22 determines whether the data is actual data PC or null data IFS in the Ethernet continuous data SD, on the basis of the MII code (S100). If the packetizing unit 22 determines that the input continuous data SD is the actual data PC (Yes in S100), the packetizing unit 22 determines whether a write count WC, indicating the count of data written into the storage unit 18, is zero (S102).

If the packetizing unit 22 determines that the write count WC is 0 (Yes in S102), it means that nothing has been written in a next packet WP, and therefore, the packetizing unit 22 writes a fixed-length packet header into the head of the packet WP (S106). On the other hand, if the packetizing unit 22 determines that the write count WC is not 0 (No in S102), it means that a header and actual data PC have already been written into a part of the packet WP, and therefore, the packetizing unit 22 refrains from writing a header. Thereafter, the packetizing unit 22 writes the acquired Ethernet actual data PC, as data, into the storage unit 18, to add the data to the packet WP (S108).

Next, the packetizing unit 22 determines whether the write count WC is equal to a packet length WL indicating the length of the fixed-length packet WP (S110). If the packetizing unit 22 determines that the write count WC is equal to the packet length WL (Yes in S110), it means that one packet WP has been completed, and therefore, the packetizing unit 22 initializes the data flag and the write count WC (S112). On the other hand, if the packetizing unit 22 determines that the write count WC is not equal to the packet length WL (No in S110), it means that the packet WP is being generated, and therefore, the packetizing unit 22 does not perform initialization. Thereafter, the packetizing unit 22 repeats step S100 and subsequent steps.

After the packetizing unit 22 has determined in step S100 that the input continuous data SD is null data IFS (No in S100), if the packetizing unit 22 determines that the immediately preceding continuous data SD was actual data PC (Yes in S114), the packetizing unit 22 proceeds to step S102 and performs step S102 and subsequent steps. In this case, in step S108, the packetizing unit 22 writes the null data IFS, as data, into the storage unit 18. When the tail end of the fixed-length packet WP coincides with the tail end of the Ethernet actual data PC, the packetizing unit 22 adds null data IFS following the tail end of the packet WP. As a result, even in the case where the tail end of the preceding packet WP is not null data IFS but coincides with the tail end of the Ethernet actual data PC, the null data IFS is transmitted in the succeeding packet WP, following the transmission of the preceding packet WP. This allows the receiving device 16 to determine that the preceding packet WP has ended with the tail end of the Ethernet actual data PC.

On the other hand, if the packetizing unit 22 determines that the immediately preceding data was not the actual data PC (No in S114) but the null data IFS, the packetizing unit 22 determines whether the data which has been written as the packet WP includes any Ethernet data that should be transmitted, or in other words, whether the data written in the storage unit 18 includes only null data IFS that can be deleted (S116). The packetizing unit 22 can use a flag indicating the presence or absence of actual data PC to determine the existence of the actual data PC. If the packetizing unit 22 determines that the packet WP includes actual data PC (Yes in S116), the packetizing unit 22 writes the input null data IFS into the storage unit 18 (S118), and then performs step S110 and subsequent steps. On the other hand, if the packetizing unit 22 determines that the packet WP does not include any actual data PC (No in S116), the packetizing unit 22 deletes the input null data IFS without writing it (S120), and then performs step S100 and subsequent steps. In other words, the packetizing unit 22 determines whether to truncate or write the received null data IFS, in step S116, depending on whether the packet WP includes only null data IFS or not. At this time, the above-described null data IFS which is to be added when the tail end of the fixed-length packet WP coincides with the tail end of the Ethernet actual data PC is treated in the same way as the Ethernet actual data PC.

Figure 7:
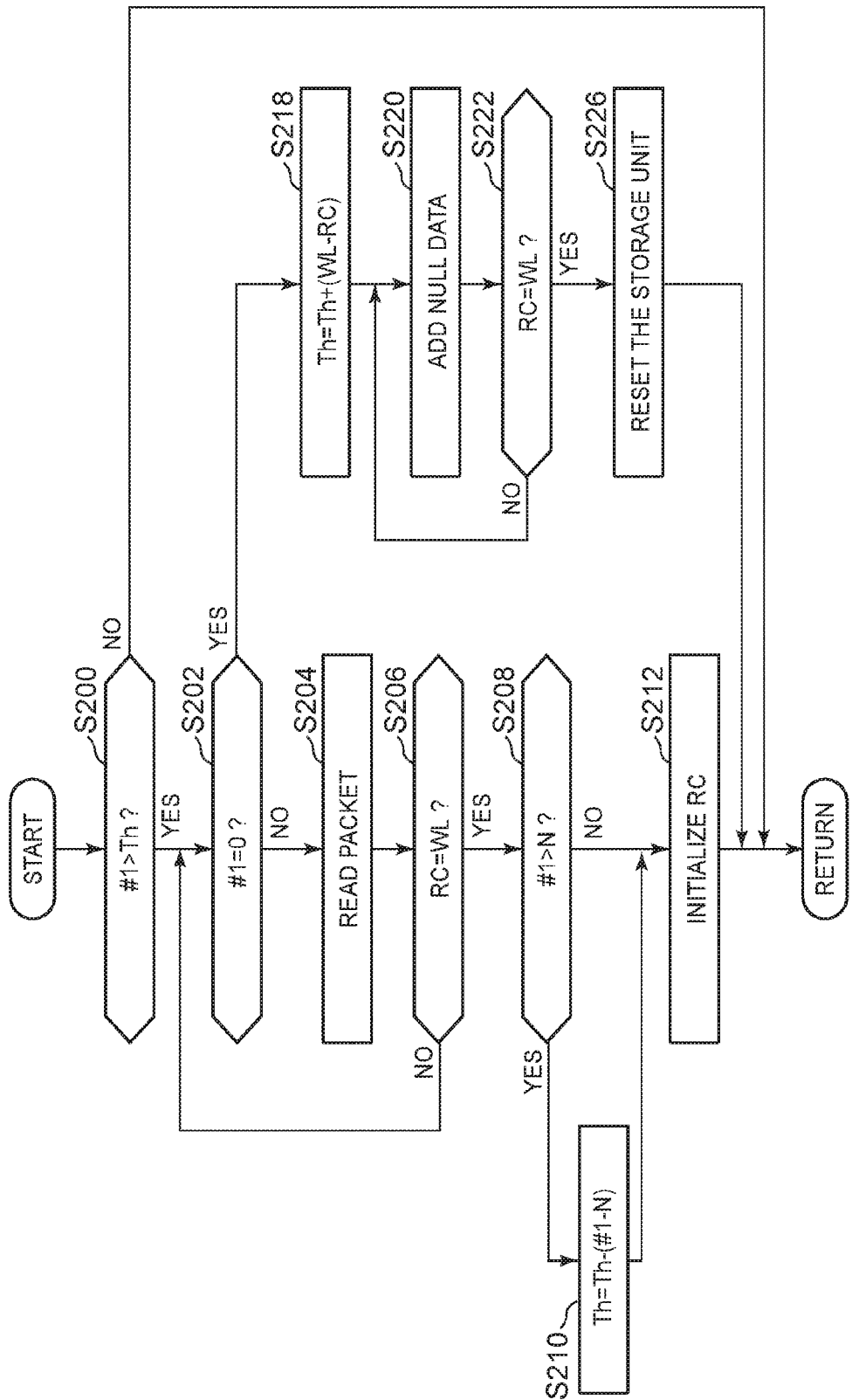
FIG. 7 is a flowchart illustrating a process of reading a fixed-length packet WP from the storage unit 18, performed by the packetizing unit 22 in the transmitting device 14.

FIG. 7 is a flowchart illustrating a process of reading a fixed-length packet WP from the storage unit 18, performed by the packetizing unit 22 in the transmitting device 14. As shown in FIG. 7, in the reading process in the transmitting device 14, the packetizing unit 22 determines whether the number #1 of pieces of data stored in the storage unit 18 is greater than a threshold value Th (S200). The number #1 of pieces of data is a value that increases or decreases in accordance with the writing or reading process. The threshold value Th, which is used for schedule management of wireless transmission, is set on the basis of the fixed length WL of the packet WP. The packetizing unit 22 repeats step S200 (No in S200) until the packetizing unit 22 determines that the number #1 of pieces of data is greater than the threshold value Th.

In the case where the packetizing unit 22 determines that the number of pieces of data is greater than the threshold value Th (Yes in S200), it determines whether the number #1 of pieces of data is 0 (S202). In the case where step S202 is performed after step S200, the number #1 of pieces of data is not 0. If the packetizing unit 22 determines that the number #1 of pieces of data is not 0 (No in S202), it reads the packet WP from the storage unit 18 (S204), increments a read count RC by 1, and outputs the packet WP to the transmitting unit 26. The read count RC indicates the number of operations of reading data from the storage unit 18, performed for one packet WP. The packetizing unit 22 determines whether the read count RC is equal to the fixed length WL of the packet WP (S206). The packetizing unit 22 repeats steps S202 to S206 (No in S206) until the read count RC becomes the fixed length WL. It is noted that, in step S202 performed after step S206, the number #1 of pieces of data can be determined to be 0.

In the case where the packetizing unit 22 determines that the read count RC has become the fixed length WL (Yes in S206), it determines whether the number #1 of pieces of data is greater than N which is the number of pieces of data for determination (S208). The number N for determination is a value used for optimizing the latency. The smaller value is more preferable; the ideal value is 0. In the case where the number N for determination is 0, the data left in the storage unit 18 is zero in the state where the packet WP has been read from the storage unit 18.

If the packetizing unit 22 determines that the number #1 of pieces of data is greater than the number N for determination (Yes in S208), it resets the threshold value Th to "Th−(#1−N)" (S210). In this manner, the packetizing unit 22 reduces the threshold value Th. On the other hand, if the packetizing unit 22 determines that the number #1 of pieces of data is not greater than the number N for determination (No in S208), it does not reset the threshold value Th. Thereafter, the packetizing unit 22 initializes the read count RC (S212), and repeats step S200 and subsequent steps.

In the case where the packetizing unit 22 determines in step S202 that the number #1 of pieces of data is 0 (Yes in S202), it means an error state in which no data is left in the storage unit 18, i.e. shortage of data. Therefore, the packetizing unit 22 resets the threshold value Th to "Th+(WL−RC)" so as to reduce the shortage of data (S218). In other words, the packetizing unit 22 adjusts the threshold value Th on the basis of the read count RC that indicates the amount of data read from the storage unit 18. In this manner, the packetizing unit 22 slightly increases the too small threshold value Th, which can suppress shortage of the data stored in the storage unit 18. Thereafter, the packetizing unit 22 adds the null data IFS to the packet WP (S220), without reading the data in the storage unit 18, while incrementing the read count RC. Thereafter, the packetizing unit 22 repeats step S220 (No in S222) until the read count RC becomes the fixed length WL. Once the packetizing unit 22 determines that the read count RC has become the fixed length WL (Yes in S222), it resets the region corresponding to the packet in the storage unit 18 (S226), and repeats step S200 and subsequent steps.

Figure 8:
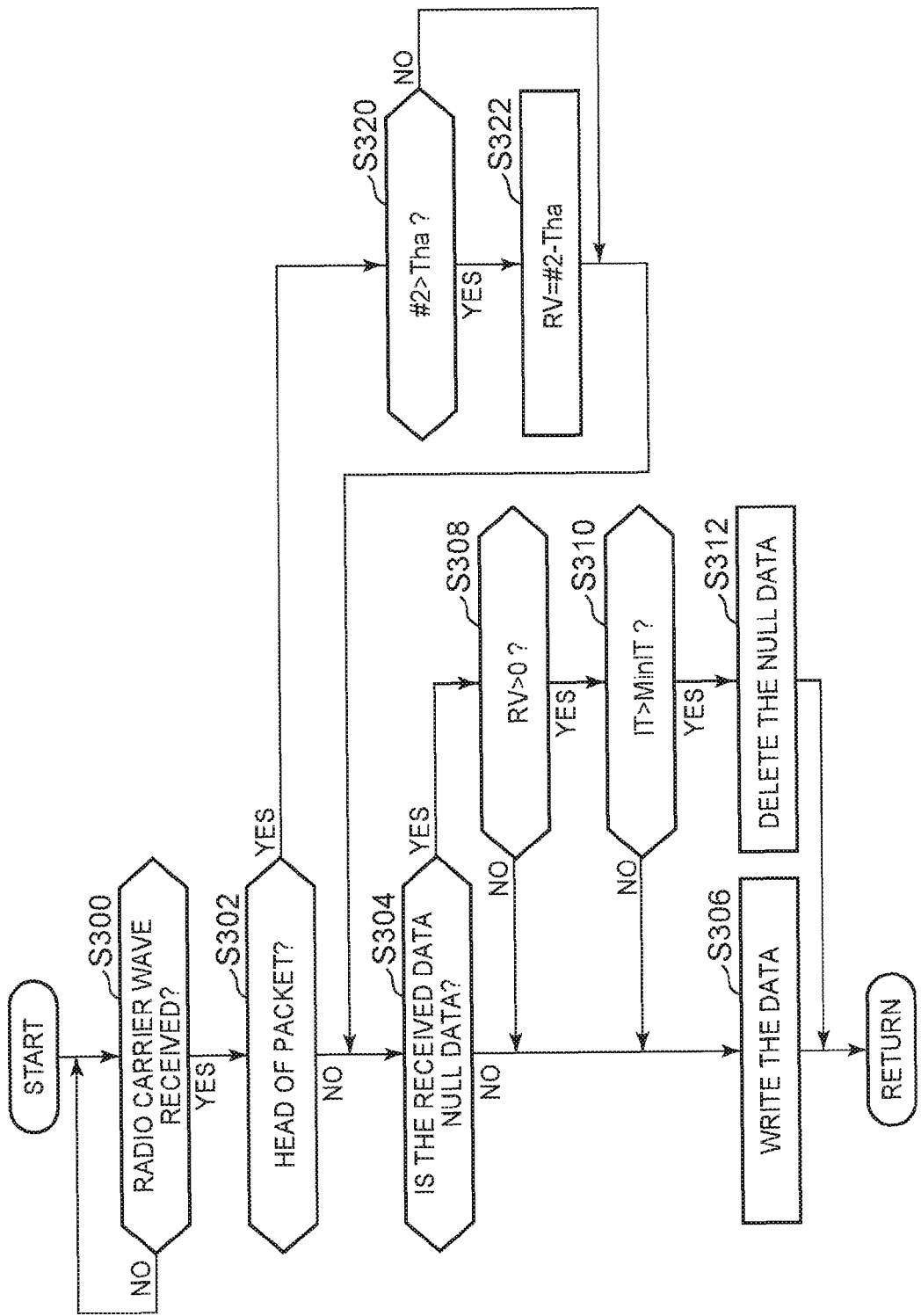
FIG. 8 is a flowchart illustrating a process of writing a received fixed-length packet WP to a storage unit 18, performed by a data generating unit 32 in a receiving device 16.

FIG. 8 is a flowchart illustrating a process of writing a received fixed-length packet WP to the storage unit 18, performed by the data generating unit 32 in the receiving device 16. As shown in FIG. 8, in the writing process in the receiving device 16, the data generating unit 32 determines whether data in the form of radio carrier wave has been received (S300). The data generating unit 32 repeats step S300 (No in S300) until the data in the form of radio carrier wave is received. If the data generating unit 32 determines that the data in the form of radio carrier wave has been received (Yes in S300), it determines whether the received data is the head of a packet WP (S302). If the data generating unit 32 determines that it is not the head of the packet WP (No in S302), it determines whether the received data is null data IFS (S304). If the data generating unit 32 determines that the received data is not null data IFS (No in S304), it means that the received data is actual data PC. In this case, the data generating unit 32 writes the data, which is the actual data PC, into the storage unit 18 (S306), and then repeats step S300 and subsequent steps.

On the other hand, if the data generating unit 32 determines that the received data is null data IFS (Yes in S304), it determines whether a delete count RV is greater than 0 (S308). The delete count RV, which is a value for determining whether to delete null data IFS or not, is decremented by 1 every time the null data IFS is deleted. If the data generating unit 32 determines that the delete count RV is greater than 0 (Yes in S308), the data generating unit 32 determines whether the null data amount IT, corresponding to the time during which null data IFS continues after actual data PC, is greater than a minimum amount MinIT of the null data amount IT (S310). The minimum amount MinIT is 96 bits, for example. If the data generating unit 32 determines that the null data amount IT is greater than the minimum amount MinIT (Yes in S310), it decrements the delete count RV by 1, and deletes the received null data IFS (S312). In this manner, the data generating unit 32 can adjust the clock timing, by deleting the null data IFS, so as to comply with the Ethernet standard. Thereafter, the data generating unit 32 repeats step S300 and subsequent steps. On the other hand, if the data generating unit 32 determines that the delete count RV is 0 or less (No in S308) or determines that the null data amount IT is equal to or less than the minimum amount MinIT (No in S310), then the data generating unit 32 writes the received null data IFS, as data, into the storage unit 18 (S306).

When the data generating unit 32 determines in step S302 that the received data in the form of radio carrier wave is the head of a packet WP (Yes in S302), it determines whether the number #2 of pieces of data, indicating the number of pieces of data remaining in the storage unit 18, is greater than a threshold value Tha (S320). The threshold value Tha is a predetermined value used for determining whether to write newly received null data IFS into the storage unit 18 or delete it. In other words, the threshold value Tha is the ideal number of pieces of data of the preceding packet WP being left in the storage unit 18 at the time when a new packet WP is received. The ideal threshold value Tha is a value that can improve the latency and eliminate shortage of data. As an example, the threshold value Tha can be two to four. If the data generating unit 32 determines that the number #2 of pieces of data is greater than the threshold value Tha (Yes in S320), it means that the number #2 of pieces of data remaining in the storage unit 18 is too large. Therefore, the data generating unit 32 resets the delete count RV to "#2−Tha" (S322) such that the number #2 of pieces of data remaining at the time of arrival of the head of the packet WP is decreased and that the shortage of data is prevented. Thereafter, the data generating unit 32 deletes the null data IFS in step S312. In this manner, the data generating unit 32 is able to delete the null data IFS until the delete count RV becomes 0, to thereby reduce the number #2 of pieces of data at the time when a new packet WP is received and, thus, to improve the latency. For example, in the case where the Ethernet clock on the transmitting side is faster than the Ethernet clock on the receiving side, the number #2 of pieces of data remaining in the storage unit 18 can become too large. On the other hand, if the data generating unit 32 determines that the number #2 of pieces of data is not greater than the threshold value Tha (No in S320), it means that the number #2 of pieces of data left is appropriate, and therefore, the data generating unit 32 does not reset the delete count RV. Thereafter, the data generating unit 32 performs step S304 and subsequent steps. In this manner, the data generating unit 32 is able to perform cycle adjustment in the receiving device 16, on the basis of the number #2 of pieces of data in the storage unit 18 at the time of arrival of the head of the packet WP, or, on the basis of the remaining amount of data.

Figure 9:
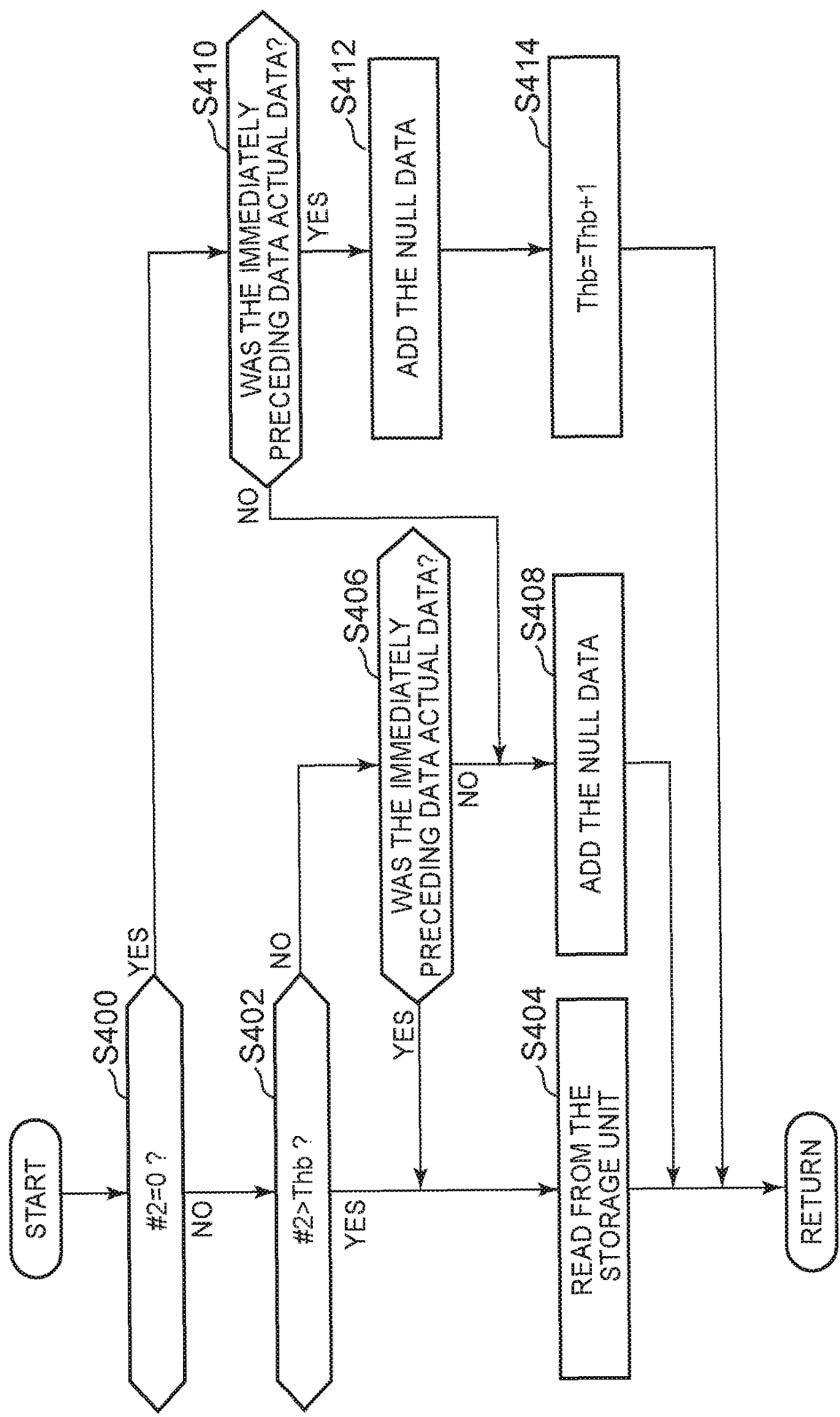
FIG. 9 is a flowchart illustrating a process of reading a fixed-length packet WP which has been written into the storage unit 18, performed by the data generating unit 32 in the receiving device 16.

FIG. 9 is a flowchart illustrating a process of reading a fixed-length packet WP written in the storage unit 18, performed by the data generating unit 32 in the receiving device 16. As shown in FIG. 9, in the reading process in the receiving device 16, the data generating unit 32 determines whether the number #2 of pieces of data in the storage unit 18 is 0 (S400). If the data generating unit 32 determines that the number #2 of pieces of data is not 0 (No in S400), it determines whether the number #2 of pieces of data is greater than a threshold value Thb (S402). The threshold value Thb is a value for determining whether to add null data IFS or not. If the data generating unit 32 determines that the number #2 of pieces of data is greater than the threshold value Thb (Yes in S402), it reads the continuous data SD including the Ethernet actual data PC and the null data IFS, stored in the storage unit 18 (S404), and outputs the read data to the data transmitting unit 34.

When the data generating unit 32 determines in step S402 that the number #2 of pieces of data is not greater than the threshold value Thb (No in S402), it determines whether the immediately preceding data was actual data PC (S406). If the data generating unit 32 determines that the immediately preceding data was actual data PC (Yes in S406), it performs step S404. On the other hand, if the data generating unit 32 determines that the immediately preceding data was not actual data PC (No in S406), i.e. if the immediately preceding data was null data IFS, the data generating unit 32 adds the null data IFS (S408), and repeats step S400 and subsequent steps, without reading the continuous data SD in the storage unit 18. In this manner, even in the case where the number #2 of pieces of data is smaller than the threshold value Thb, the data generating unit 32 can add null data IFS following the preceding null data IFS, to secure the number of pieces of data that can resolve uncertainty in the receiving time in the storage unit 18 and to suppress shortage of the data stored in the storage unit 18. If the data generating unit 32 determines in step S400 that the number #2 of pieces of data is 0 (Yes in S400), i.e. if no data is remaining in the storage unit 18, the data generating unit 32 determines whether the immediately preceding data was actual data PC (S410). If the data generating unit 32 determines that the immediately preceding data was not actual data PC (No in S410), it performs step S408 and subsequent steps. On the other hand, if the data generating unit 32 determines that the immediately preceding data was actual data PC (Yes in S410), it adds null data IFS for error handling (S412). Thereafter, the data generating unit 32 resets the threshold value Thb to "Thb+1" (S414), and repeats step S400 and subsequent steps.

As described above, in the communication system 10, the control unit 24 in the transmitting device 14 reduces the radio carrier wave transmitted by the transmitting unit 26. This can reduce the operating cost and also decrease the consumed power. Further, as the transmission of radio carrier wave is reduced in the communication system 10, even if the number of the communication devices 12 increases, the interference and crosstalk between the radio carrier waves transmitted by the respective communication devices 12 can be reduced. Therefore, the communication devices 12 can implement spatial multiplexing of wireless channels even in the 60 GHz band with only four channels, for example.

Furthermore, in the communication system 10, the packetizing unit 22 deletes at least a part of the null data IFS. This can reduce the time interval between the pieces of actual data PC. The latency in the communication system 10 can therefore be improved.

Figure 10:
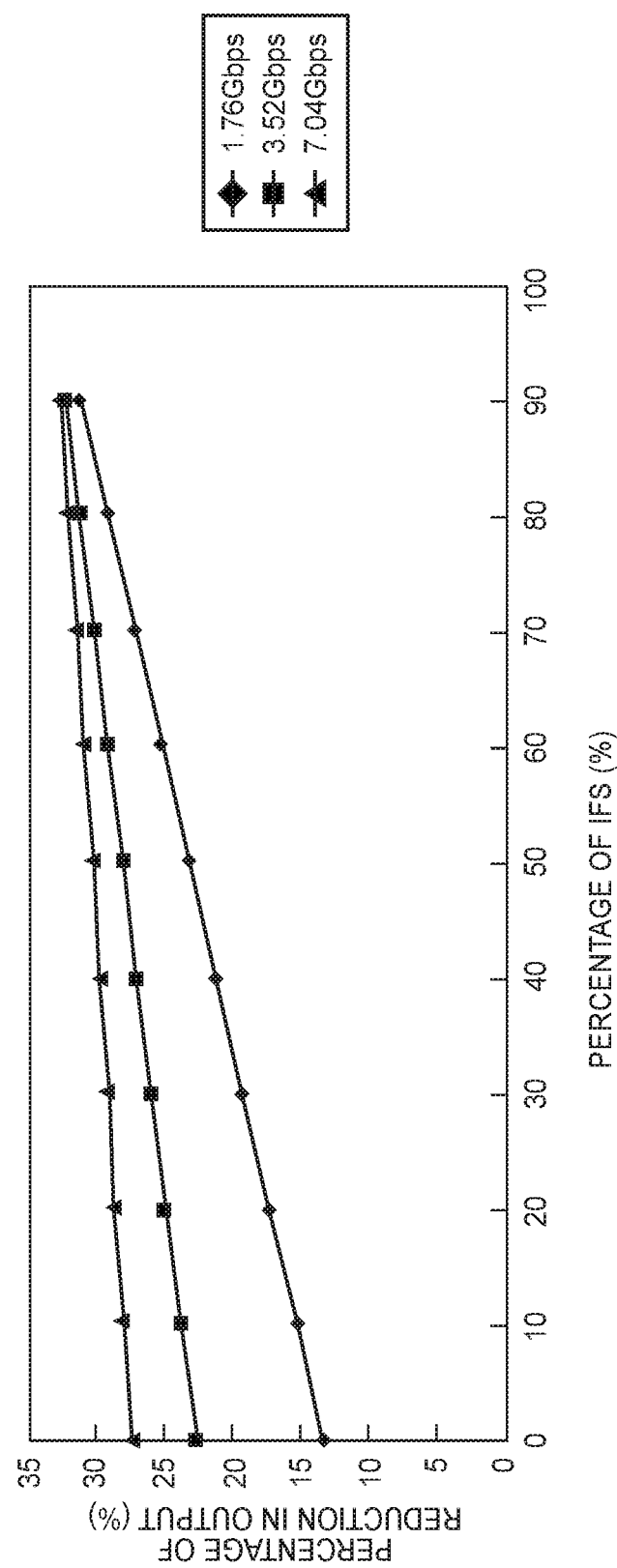
FIG. 10 is a graph showing the relationship between the percentage of null data IFS and the percentage of reduction in output.

A description will be made below of simulations for proving the above-described effects. FIG. 10 is a graph showing the relationship between the percentage of null data IFS and the percentage of reduction in output. The percentage of reduction in output was measured for three different wireless communication speeds. The size of packet WP was 4096 bytes. The simulation conditions in FIG. 10 were as follows:
(Condition 1) Communication speed of Ethernet: 1 Gbps
(Condition 2) [Operating power (for receiving radio carrier waves) of the transmitting unit 26 and the receiving unit 30]:[Power consumed by the always-on circuits in the communication device 12 other than the transmitting unit 26 and the receiving unit 30]=1:1
(Condition 3) [Standby power of the transmitting unit 26 and the receiving unit 30]:[Operating power (for receiving radio carrier waves) of the transmitting unit 26 and the receiving unit 30]=1:2

It is apparent from FIG. 10 that the percentage of reduction in output increases with the increase of the percentage of null data IFS. It is also apparent that, with the same percentage of null data IFS, the percentage of reduction in output increases with the increase of the communication speed. It is therefore understood that the communication system 10 described above can reduce the power consumption particularly in the case where the communication speed is fast and the percentage of null data IFS is large. For example, the communication system 10 can reduce the power consumption by 15% to 30% under the above-described conditions.

Figure 11:
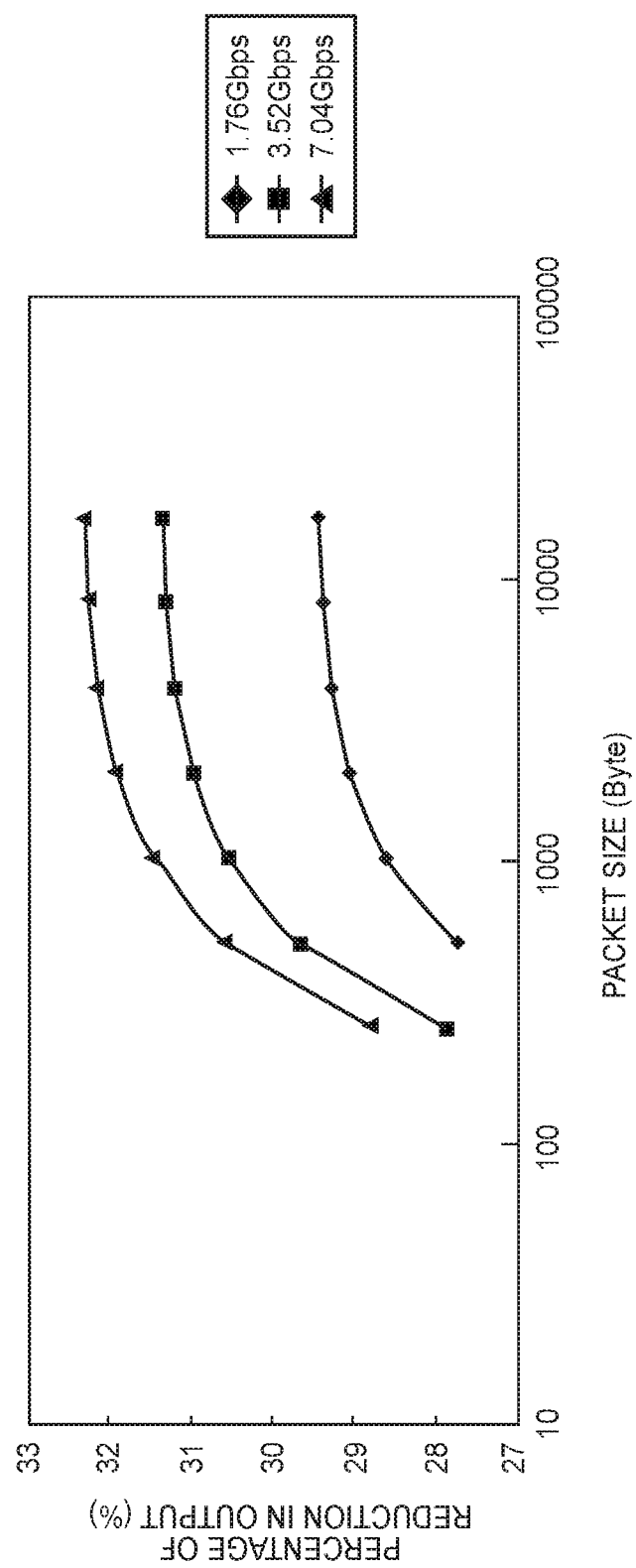
FIG. 11 is a graph showing the relationship between the size of the packet WP and the percentage of reduction in output.

FIG. 11 is a graph showing the relationship between the size of packet WP and the percentage of reduction in output. The percentage of reduction in output was measured for three different wireless communication speeds. The percentage of null data IFS was 80%. The simulation conditions in FIG. 11 were identical to the conditions 1 to 3 in FIG. 10.

It is apparent from FIG. 11 that the percentage of reduction in output increases with the increase of the size of packet WP. It is also apparent that, with the same size of packet WP, the percentage of reduction in output increases with the increase of the communication speed. It is further apparent that the reduction in output accompanying the increase in size of packet WP is particularly noticeable when the communication speed is fast.

Figure 12:
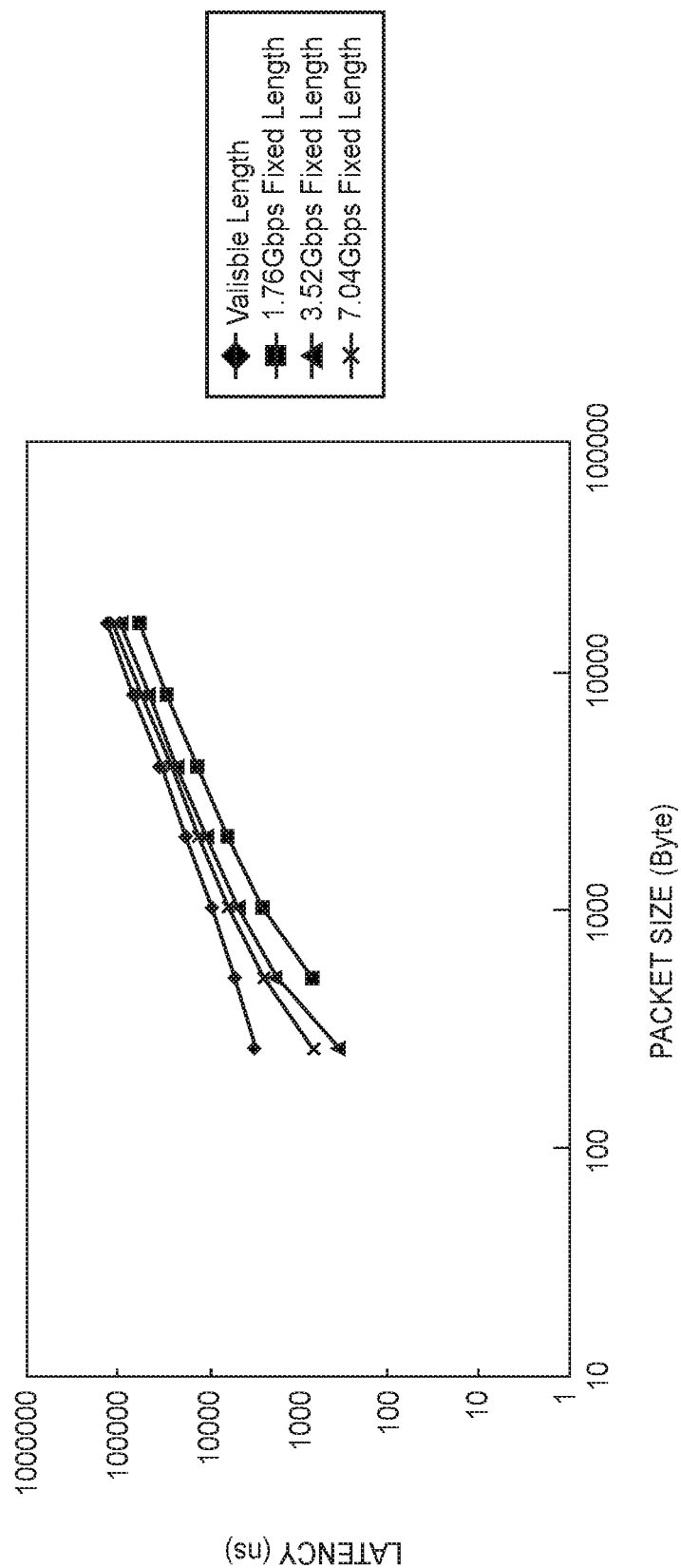
FIG. 12 is a graph showing the relationship between the size of the packet WP and the latency.

FIG. 12 is a graph showing the relationship between the size of packet WP and the latency. The latency was measured for a variable-length packet WP and for three different communication speeds for a fixed-length packet WP. In FIG. 12, the Ethernet communication speed was 1 Gbps.

It is apparent from FIG. 12 that the latency improves with the reduction in size of the packet WP. It is also apparent that the latency improves in the case of transmitting/receiving fixed-length packets WP generated by dividing Ethernet actual data PC, as compared with the case of transmitting/receiving variable-length packets WP which are generated in units of Ethernet actual data PC. For example, it is apparent that, for some wireless communication speed and some size of packet WP, the latency in the case of transmitting/receiving fixed-length packets can be made about one-eighths of the latency in the case of transmitting/receiving variable-length packets.

The arrangement of the constituent elements, their connection relationship, and the numerical values such as the number of pieces, the number of bits, etc. in the above-described embodiment can be changed as appropriate. Further, different embodiments can be combined.

For example, in the above-described embodiment, the mode of transmitting a variable-length packet WP and the mode of transmitting a fixed-length packet WP were described independently from each other. Alternatively, the transmitting unit 26 can switch between a fixed-length packet WP whose data amount is predetermined, and a variable-length packet WP whose data amount can vary, for transmission. In this case, it is preferable for the transmitting unit 26 to transmit a fixed-length packet WP in the case where the spacing between the pieces of Ethernet actual data PC is less than a spacing threshold value. Further, it is preferable for the transmitting unit 26 to transmit a variable-length packet WP in the case where the spacing between the pieces of Ethernet actual data PC is not smaller than the spacing threshold value. It is also preferable for the packetizing unit 22 to generate a variable-length packet WP, with all null data IFS deleted, in the case where the spacing between the pieces of Ethernet actual data PC is not smaller than the spacing threshold value. Further, it can be configured such that the constituent elements in the above-described embodiment function as a computer reads a program for transmission or a program for reception.

Figure 13:
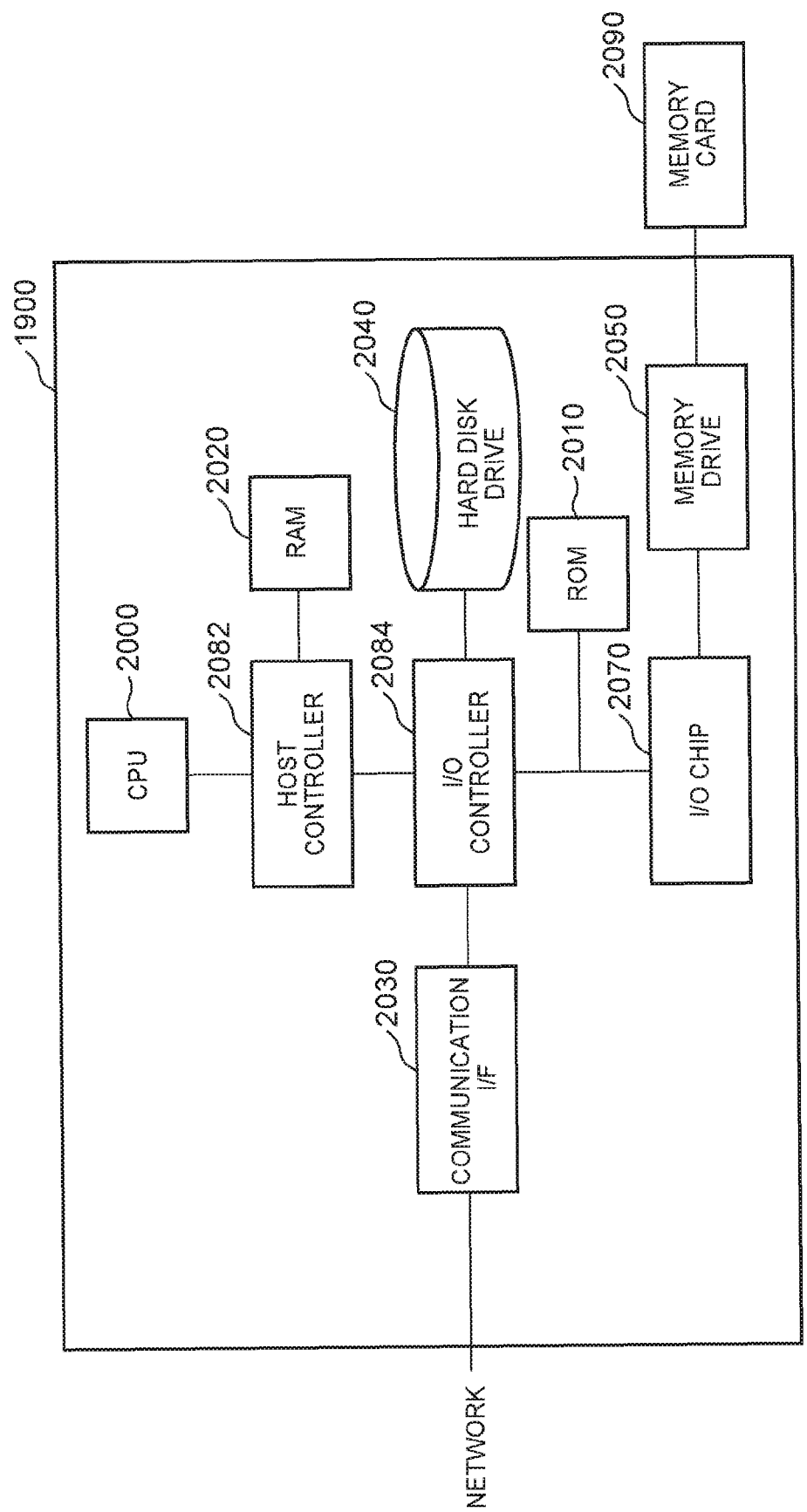
FIG. 13 shows an exemplary hardware configuration of a computer 1900 according to an embodiment of the present invention.

FIG. 13 shows, by way of example, the hardware configuration of a computer 1900 according to the present embodiment. The computer 1900 according to the present embodiment is an example of an information processing unit. The computer 1900 includes: a CPU peripheral portion having a CPU 2000 and a RAM 2020 connected to each other via a host controller 2082; an input/output portion having a communication interface 2030 and a hard disk drive 2040 connected to the host controller 2082 via an input/output controller 2084; and a legacy input/output portion having a ROM 2010, a memory drive 2050, and an input/output chip 2070 connected to the input/output controller 2084.

The host controller 2082 connects the RAM 2020 with the CPU 2000 which accesses the RAM 2020 at a high transfer rate. The CPU 2000 operates on the basis of the programs stored in the ROM 2010 and the RAM 2020 for control of the respective portions. The input/output controller 2084 connects the host controller 2082 with the communication interface 2030 and the hard disk drive 2040, which are relatively fast input/output devices. The communication interface 2030 communicates with other apparatuses via a network. The hard disk drive 2040 stores a display program and other programs and data used by the CPU 2000 in the computer 1900.

Further, the input/output controller 2084 is connected with the ROM 2010 and the relatively slow input/output devices of the memory drive 2050 and the input/output chip 2070. The ROM 2010 stores a boot program executed at the time of activation of the computer 1900 and/or a program dependent on the hardware of the computer 1900. The memory drive 2050 reads a program, such as a display program, or data from a memory card 2090, and provides the program or data to the hard disk drive 2040 via the RAM 2020. The input/output chip 2070 connects the memory drive 2050 to the input/output controller 2084, and also connects various input/output devices to the input/output controller 2084 via, e.g., a parallel port, serial port, keyboard port, or mouse port.

The program to be provided to the hard disk drive 2040 via the RAM 2020 is stored in a recording medium, such as the memory card 2090 or an IC card, and is provided by a user. The program such as a display program is read from the recording medium and installed via the RAM 2020 to the hard disk drive 2040 in the computer 1900, for execution in the CPU 2000.

The program for transmission, installed into the computer 1900 for causing the computer 1900 to function as the communication device 12 includes: a data receiving module, a packetizing module, a control module, and a transmitting module. These programs or modules work on the CPU 2000 and the like to cause the computer 1900 to function as: the data receiving unit 20, the packetizing unit 22, the control unit 24, and the transmitting unit 26, respectively.

The information processing described in these programs is read into the computer 1900 to function as the data receiving unit 20, the packetizing unit 22, the control unit 24, and the transmitting unit 26, which are the specific means realized by cooperation of the software and the hardware resources described above. These specific means implement information computation or processing, in accordance with the intended use of the computer 1900 of the present embodiment, to thereby establish the communication device 12 dedicated to the intended use.

The program for reception, installed into the computer 1900 for causing the computer 1900 to function as the communication device 12 includes: a receiving module, a data generating module, and a data transmitting module. These programs or modules work on the CPU 2000 and the like to cause the computer 1900 to function as: the receiving unit 30, the data generating unit 32, and the data transmitting unit 34, respectively.

The information processing described in these programs is read into the computer 1900 to function as the receiving unit 30, the data generating unit 32, and the data transmitting unit 34, which are the specific means realized by cooperation of the software and the hardware resources described above. These specific means implement information computation or processing, in accordance with the intended use of the computer 1900 of the present embodiment, to thereby establish the communication device 12 dedicated to the intended use.

For example, in the case where the computer 1900 communicates with an external device or the like, the CPU 2000 executes a communication program loaded onto the RAM 2020 and, on the basis of the content of processing described in the communication program, instructs the communication interface 2030 to perform the communication processing. The communication interface 2030, under the control of the CPU 2000, reads send data, stored in a transmission buffer area provided on a storage device such as the RAM 2020, hard disk drive 2040, or memory card 2090, and transmits the obtained send data to the network, or receives data from the network and writes the received data into a reception buffer area provided on a storage device. In this manner, the communication interface 2030 can transfer send/receive data to and from a storage device using the direct memory access (DMA) system. Alternatively, the CPU 2000 can read data from a source storage device or the communication interface 2030 and write the data to a destination communication interface 2030 or storage device, for transferring the send/receive data.

Further, the CPU 2000 reads a whole or necessary part of the files or databases stored in an external storage device such as the hard disk drive 2040 or memory drive 2050 (memory card 2090) into the RAM 2020 via DMA transfer or the like, and performs various processing on the data on the RAM 2020. The CPU 2000 then writes the processed data back to the external storage device via DMA transfer or the like. During the processing, the RAM 2020 temporarily stores the content of the external storage device. Thus, in the present embodiment, the RAM 2020 and the external storage devices are collectively referred to as the memory, storage unit, or storage device. Various information including various programs, data, tables, and databases in the present embodiment is stored in such storage devices and subjected to information processing. It is noted that the CPU 2000 can store a part of the content in the RAM 2020 in a cache memory for reading/writing data on the cache memory. In such an embodiment as well, the cache memory performs a part of the function of the RAM 2020. Therefore, in the present embodiment, it is assumed that the cache memory is also included in the RAM 2020, memory, and/or storage device, unless otherwise specified.

The CPU 2000 performs various processing on the data read out of the RAM 2020. The processing can include various computation, information processing, conditional judgment, and information search and replacement, described in the present embodiment, which are designated by sequences of instructions in programs. The CPU 2000 then writes the processed data back to the RAM 2020. For example, in the case of performing the conditional judgment, the CPU 2000 determines whether various variables described in the present embodiment each satisfy a condition that it is greater than, smaller than, not smaller than, not greater than, or equal to another variable or constant, and if the condition is satisfied (or not satisfied), branches to a different sequence of instructions, or calls a sub-routine. The CPU 2000 can also search the information stored in the databases or the files within the storage device.

The programs or modules described above can be stored in an external recording medium. The recording medium can be, besides the memory card 2090, an optical recording medium such as a DVD or a CD, a magneto-optical recording medium such as an MO, a tape medium, or a semiconductor memory such as an IC card. Further, a storage device such as a hard disk or a RAM provided in a server system connected to a private communication network or the Internet can be used as a recording medium, and the program can be provided to the computer 1900 via the network.

While the present invention has been described above with reference to the embodiment, the technical scope of the present invention is not limited to that of the above-described embodiment. It is apparent to those skilled in the art that various modifications or improvements are possible for the above-described embodiment. It is evident from description of the claims that the embodiments modified or improved are also within the technical scope of the present invention.

It should be noted that the operations, procedures, steps, or stages of each process performed by the device, system, program, or method shown in the claims, specification, or diagrams can be performed in any order unless the order is explicitly indicated by "before", "prior to" or the like or unless the output from a previous process is used in a later process. Even if the process flow is described using phrases such as "first", "next" or the like for convenience' sake in the claims, specification, or diagrams, it does not necessarily mean that the process must be performed in the described order.

The invention claimed is:

1. A transmission method comprising:
a data receiving step of receiving continuous data from a network, the continuous data including actual data and null data;
a packetizing step of deleting at least a part of the null data from the continuous data to generate a packet for wireless communication;
a transmitting step of modulating the packet into a radio carrier wave and wirelessly transmitting the resulting packet, wherein the transmitting step switches between a packet of fixed length with a predetermined data amount, and a packet of variable length with a variable data amount; and
a control step of causing transmission of the radio carrier wave in the transmitting step to be stopped during at least a part of a time period in which no such packet is transmitted wirelessly.

2. The transmission method of claim 1, wherein the packetizing step adds null data to the head of a next packet when the packet of fixed length has a tail end that coincides with a tail end of the actual data in the continuous data.

3. The transmission method of claim 1, wherein the transmitting step begins only after the continuous data has been processed by a predetermined data amount or more and stored in the storage unit, and wherein the packetizing step stores the packet of the predetermined fixed length, and adjusts a threshold value used for determining whether the packet can be read from the storage unit or not, on the basis of the amount of data read from the storage unit.

4. A receiving method comprising:
a receiving step of demodulating a radio carrier wave transmitted wirelessly from a transmitting side into a packet and receiving a resulting packet, the radio carrier wave being transmitted in a state where at least a part of null data has been deleted on the transmitting side from continuous data received from a first network, the continuous data including actual data and the null data;
a storing step of storing at least one piece of data in a packet of fixed length;
a data generating step of adding the null data to, or deleting the null data from, the packet to generate continuous data, wherein the data generating step further comprises:
determining that data in a form of the radio carrier wave is received;
determining that the data in the form of the radio carrier wave is a head of the packet;
determining that a number of pieces of data remaining in a storage unit is greater than a first threshold value;
resetting a delete count;
deleting the null data until the delete count is 0; and
writing the data in the form of the radio carrier wave to the storage unit; and
a data transmitting step of transmitting the continuous data including the actual data and the null data to a second network.

* * * * *